United States Patent [19]

Margalit et al.

[11] 4,195,122

[45] Mar. 25, 1980

[54] ADDITIVE FOR HIGH DRAIN RATE LITHIUM CELLS

[75] Inventors: Nehemiah Margalit, Levittown; Philip E. Krouse, Yardley, both of Pa.

[73] Assignee: ESB Technology Company, Yardley, Pa.

[21] Appl. No.: 945,426

[22] Filed: Sep. 25, 1978

[51] Int. Cl.² ............................................. H01M 6/14
[52] U.S. Cl. ................................. 429/194; 429/199; 429/218
[58] Field of Search ............... 429/194, 197, 198, 199, 429/201, 203, 188

[56] References Cited

U.S. PATENT DOCUMENTS

| | | | |
|---|---|---|---|
| 3,887,397 | 6/1975 | Horning | 429/194 |
| 3,945,848 | 3/1976 | Dey et al. | 429/198 |
| 3,997,362 | 12/1976 | Eustace et al. | 429/194 |

*Primary Examiner*—Anthony Skapars
*Attorney, Agent, or Firm*—G. W. Rudman; E. C. MacQueen

[57] ABSTRACT

An improved high drain rate lithium cell is provided. The improvement is the use of an additive to stabilize the cell. The additive is a minor portion of alkali metal hexafluorophosphate.

8 Claims, No Drawings

ADDITIVE FOR HIGH DRAIN RATE LITHIUM CELLS

BACKGROUND OF THE INVENTION

1. Field of the Invention

This invention relates to an additive for non-aqueous electrolyte of a high rate lithium electrochemical cell. More particularly, it relates to the use of alkali metal hexafluorophosphates as additives for stabilizing the cell.

2. Prior Art

It has been known for some time that high rate drain cells having anodes of lithium and electrolyte of solvent and solute are not stable, particularly at high temperatures.

The instability problem is three fold. First, there is a short discharge life after storage due to apparent chemical changes in the electrolyte; secondly, there is a pressure build-up because of detrimental side reactions in the electrolyte; and thirdly, there are cell degradation reactions among cell components. Yet these same unstable electrolyte systems for lithium batteries produce extremely high energy due to high conductivity of the solute in the solvent.

In lithium cells, cell degradation reactions can be manifested in various ways: crust formation on the anode, e.g., with $SOCl_2$ solutions; gas formation and cell rupture, e.g., with lithium hexafluoroarsenate in methylformate, and polymerization of solvent, e.g., in THF solutions. In all three type degradations, the reaction leads to decreased performance, if not complete failure, of the cell. When using non-aqueous solvents in the electrolyte, both gassing and formation of viscous, if not solid, reaction products near the anode are of major concern; stable or stabilized electrolyte has to be used in lithium cells.

There are many applications, e.g., watch, camera, etc., for which batteries must be constructed in a shape requiring high conductivity to permit efficient and economical utilization of the chemicals. Design limitations require utilization of highly conductive electrolytes. However, conditions of use require electrolytes capable of long term storage.

In U.S. Pat. No. 3,887,397, issued June 3, 1975, to Robert J. Horning, it is disclosed that in lithium cells having a highly conductive methylformate/lithium hexafluoroarsenate electrolyte, the addition of small amounts of lithium tetrafluoroborate will significantly improve the stability of the cell. Thus by using lithium tetrafluoroborate as a stabilizer, Horning succeeded in practically eliminating the gassing reaction between lithium and the specific electrolyte.

However, no mention is made in the patent of any other additives which could be utilized or of any ability to control non-gassing reactions causing deposition of reddish-brown viscous products on and near the lithium. Such viscous deposits will hinder the performance of the anode after prolonged storage and/or at higher rates by slowing ionic mobility near the anode.

It is the objective of this invention to provide a method of stabilizing non-aqueous lithium batteries in terms of reducing chemical interactions between the electrolyte and cell components.

A more particular object of this invention is to provide stabilizing additives for high rate lithium cells so that gassing and other reaction product formations are not observed.

SUMMARY OF THE INVENTION

It has been discovered that the stability of high rate batteries which contain a lithium anode, an electrolyte having a solvent and solute and a cathode will be significantly improved by the addition to the electrolyte of a alkali metal hexafluorophosphate.

DETAILED DESCRIPTION OF THE INVENTION

The cathode can be any cathodic material which is inert to the electrolyte, among these are $V_2O_5$, $Ag_2CrO_4$, $(CF)n$, $MnO_2$, $CuS$ and others which are known to those skilled in the art. As stated above, this invention relates basically to stabilizing of the electrolyte and anode, hence, does not require any particular cathode for use.

The solvents of the electrolyte used in the current invention are those which are known for use in high rate cells. Examples include methylformate, gamma butyrolactone, 1,2-dimethoxyethane and 1,3-dioxolane, and mixtures thereof.

The solutes which are dissolved in the solvents to form the electrolyte are also known to those skilled in the art. Examples include the hexafluoroarsenates, the trifluoromethylsulfonates and the perchlorates. It is preferred that the salt of these cations be the lithium salt.

The additive is a hexafluorophosphate salt of lithium, sodium, potassium, rubidium, cesium, beryllium, magnesium, calcium, barium, aluminum or mixtures thereof. The lithium, sodium and potassium salts are preferred.

The amount of the hexafluorophosphate salt which should be employed vary depending upon the stability desired. Normally, the amount of hexafluorophosphate salt will range from approximately 0.05 molar to as much as 0.8 molar in the electrolyte. A more preferred range is about from 0.05 to 0.1 molar percent.

The current inventors have found that the use of these hexafluorophosphate salts not only stops the gas reaction but also decreases and practically eliminates the non-gassing side reactions. For example, in the case of lithium hexafluoroarsenate in methylformate with lithium tetrafluoroborate or no additives, these side reactions produce a reddish-brown viscous product that clings to the lithium. This product will effect the high rate performance of cells by slowing ionic mobility near the anode. The current inventors have found that even in highly reactive lithium hexafluoroarsenate in methylformate electrolyte, the elimination of the side reaction is increased if one uses an alkali metal hexafluorophosphate salt.

EXAMPLE 1

Strips of lithium were placed in four heavy glass tubes each having a different electrolyte solution. The tubes were part of an apparatus used to measure the gassing and observe corrosion on the lithium. The apparatus consisted of a heavy glass tube (Fischer and Porter Co., Aerosol Reaction Vessel, No. 110–205) connected to an Bourdon gauge ($-30$ to 150 inches mercury, U.S. Gauge No. 5060). The seal between the gas vessel and tube leading to the gauge was made with a stainless steel adapter plug fitted with a silicone rubber "O" ring.

The sealed apparatus was placed into an oven at 165° F. and monitored daily for gassing and for impurity formation on the lithium.

The experiments were continued until there was a significant increase in the pressure within the test tubes of 1 to 1½ atmospheres of pressure over the pressure of equilibrium at 165° F. or until they extended over a period of time in which a significant difference could be seen in the additives.

In all the tests the solvent was methylformate and the solute was 2.5 molar $LiAsF_6$. The electrolyte differed only by additive. The results were as follows:

| Additive | Hours Until Significant Pressure Build Up | Visual Inspection Of Lithium |
|---|---|---|
| None | 560 | Substantial Amount Of Viscous Material |
| 0.1M $LiPF_6$ | Greater Than 786* | Substantially Free Of Viscous Material |
| 0.1M $NaPF_6$ | Greater Than 975** | Substantially Free Of Viscous Material |
| 0.1M $KPF_6$ | Greater Than 975** | Substantially Free Of Viscous Material |

*The test was deliberately terminated at this point because apparatus was leaking.
**The test was deliberately terminated at this point to free the apparatus for other use.

We claim:

1. An improvement in an electrochemical cell having a lithium anode, a non-aqueous electrolyte comprised of a solvent and solute, other than alkali metal hexafluoro phasphate and a cathode, the improvement comprises having as an additive a minor portion of alkali metal hexafluorophosphate salt; wherein the amount of hexafluorophosphate salt ranges from 0.05 to 0.1 molar.

2. The cell of claim 1 wherein the hexafluorophosphate salt is lithium, sodium or potassium.

3. The cell of claim 1 wherein the electrolyte is methylformate, gamma-butyrolactone, 1,2 dimethoxyethane, 1,3 dioxolane or mixtures thereof.

4. The cell of claim 1 wherein the electrolyte is methylformate.

5. The cell of claim 1 wherein the solute is lithium hexafluoroarsenate, lithium trifluoromethylsulfonate or lithium perchlorate.

6. In a current producing cell having a lithium anode, an electrolyte of methylformate having lithium hexafluoroarsenate dissolved therein and a cathode, the improvement comprising having a minor portion of lithium hexafluorophosphate dissolved in said electrolyte; wherein the amount of lithium hexafluorophosphate ranges from 0.05 to 0.1 molar.

7. In a current producing cell having a lithium anode, an electrolyte of methylformate having lithium hexafluoroarsenate dissolved therein and a cathode, the improvement comprising having a minor portion of potassium hexafluorophosphate dissolved in said electrolyte; wherein the amount of potassium hexafluorophosphate ranges from 0.05 to 0.1 molar.

8. In a current producing cell having a lithium anode, an electrolyte of methylformate having lithium hexafluoroarsenate dissolved therein and a cathode, the improvement comprising having a minor portion of sodium hexafluorophosphate dissolved in said electrolyte; wherein the amount of sodium hexafluorophosphate ranges from 0.05 to 0.1 molar.

* * * * *